United States Patent [19]

Ma

[11] Patent Number: 5,129,310

[45] Date of Patent: Jul. 14, 1992

[54] AUTO RIGGING FOR SERVO ACTUATOR SYSTEM

[75] Inventor: Carlton Y. Ma, Montebello, Calif.

[73] Assignee: Hydraulic Units, Incorporated, Duarte, Calif.

[21] Appl. No.: 539,068

[22] Filed: Jun. 15, 1990

[51] Int. Cl.$^5$ .................. F01B 11/00; F01B 25/00
[52] U.S. Cl. .................. 91/171; 91/189 R; 91/361; 91/471; 91/517
[58] Field of Search .......... 91/171, 189 R, 459, 91/508, 512, 515, 517, 1, 361, 363 R, 363 A, 471; 60/911

[56] References Cited

U.S. PATENT DOCUMENTS

| | | | |
|---|---|---|---|
| 3,355,993 | 12/1967 | Williamson | 91/171 |
| 3,438,306 | 4/1969 | Kazmarek | 91/189 |
| 3,664,234 | 5/1972 | Simons et al. | 91/363 R |
| 4,120,469 | 10/1978 | Westermeier | 91/363 A |
| 4,220,004 | 9/1980 | Abeille et al. | 91/171 |
| 4,336,745 | 6/1982 | Lund | 91/361 |
| 4,537,547 | 8/1985 | Cole | 414/5 |
| 4,567,813 | 2/1986 | Garnjost | 91/363 A |
| 4,671,166 | 6/1987 | Glaze et al. | 91/361 |
| 4,700,610 | 10/1987 | Bauer et al. | 91/390 |
| 4,712,470 | 12/1987 | Schmitz | 91/433 |
| 4,800,798 | 1/1989 | Boldrin et al. | 91/361 |
| 4,826,110 | 5/1989 | Le | 91/363 A |
| 4,901,628 | 2/1990 | Krage | 91/1 |

Primary Examiner—Edward K. Look
Assistant Examiner—Hoang Nguyen
Attorney, Agent, or Firm—Poms, Smith, Lande & Rose

[57] ABSTRACT

A dual servo actuation system is automatically equalized or rigged by electronic control circuits. A static auto rigging bias is applied to one or the other, or both, of a pair of electro hydraulic servo valves that respectively control two hydraulic actuators driving a common member, such as an aircraft control surface. An auto rigging bias, which substantially eliminates force fight, is automatically generated and stored as a fixed quantity prior to use of the system for control of the common member. With a zero commanded output of the two actuators, a difference of differential pressures at the actuators is obtained and caused to change the number in a counter as long as the difference exceeds a threshold. The counter number, while it is above the threshold, is continuously applied as a bias signal to decrease the force fight, and the number in the counter is stored as a fixed bias signal when the force fight indicated by the difference of differential pressures drops below the threshold. This fixed bias signal is then applied to the servo actuation system during system operation.

16 Claims, 2 Drawing Sheets

AUTO RIGGING FOR SERVO ACTUATOR SYSTEM

BACKGROUND OF THE INVENTION

The present invention relates to multiple servo actuation systems, and more particularly concerns the balancing or equalizing of forces exerted by two or more actuators on a common member.

For various reasons, such as, for example, the length of a driven member, or to obtain redundant operation, servo actuation systems may employ two or more actuators connected at mutually spaced points of a member that is to be driven by the two actuators acting in unison. Such multiple actuator arrangements are often found in systems for operation of aircraft control surfaces, such as ailerons, flaps, elevators and the like. Frequently, where a pair of actuators is employed to drive a common member, the two are controlled by a common command input and are arranged to nominally provide identical forces to actuate the common driven member. In order to cause the dual servo controlled actuators to exert the same force at two different points on the driven member, the two systems are made as nearly identical as possible in all respects. Thus, electro hydraulic servo valves that control hydraulic actuators are made to be identical, as are the actuators and their electronic circuits. Particular attention is also directed to physical positioning and mounting of the actuators in an attempt to obtain equal strokes of the two in response to a common command and, therefore, equal displacements of the two areas of the common driven member that are connected to the actuators. Thus, in "rigging" of the servo actuators, physical mounting, location of mounting bolts and the like, must be carefully controlled, with parts shimmed or physically adjusted as necessary. Nevertheless, in spite of all effort made to equalize the dual actuators, various errors, including errors in valve alignment, electronic offsets, physical mounting structures, thermal differences, and different aging of parts, contribute to cause a net difference in the operation of the two servo controlled actuators. Because of this difference there occurs a condition known as "force fight", wherein the common command signal, fed to both of the electro hydraulic servo valves that control the two actuators, actually causes a different magnitude of stroke in the two actuators, which therefore apply different forces to the driven member. With different forces applied at two different points of the common member, forces exerted by the actuators tend to oppose each other to some extent, resulting in a highly undesirable operation, and, at the very least, in a decrease in the effectivity of actuation.

Various arrangements have been attempted to minimize this force fight in dual actuation systems. Some have attempted to continuously generate error signals during system operation and feed back such error signals during system operation to decrease the imbalance of the servo actuators. However, such a feedback signal during operation of the system may possibly cause instabilities and effect oscillation, and in some cases may cause more damage than improvement.

Accordingly, it is an object of the present invention to provide for correction or decrease of force fight in a multiple servo actuation system while minimizing or avoiding above-mentioned problems.

SUMMARY OF THE INVENTION

In carrying out principles of the present invention in accordance with a preferred embodiment thereof a fixed electrical command input is applied to a pair of servo valves to command a nominally equal stroke of first and second actuators. While the fixed command input is applied, there is generated and stored a fixed magnitude bias signal indicative of the magnitude of a force fight resulting from application of the commanded input. The bias signal represents a difference in strokes with the common command input applied to both servos. This stored bias system is then applied during subsequent operation of the servo system to at least one of the servo control valves in a sense to decrease force fight. In a specific application, an auto rigging procedure is carried out before one or more or before every use of the servo actuation system. With zero commanded input to the dual servo actuators, the force fight is measured and employed to generate a bias signal that is applied to the input of one or both of the servo valves so as to tend to decrease the force fight. When the force fight is decreased to a sufficiently low level, the value of the bias signal at that time is stored and employed thereafter in subsequent operation of the servo actuation system as a fixed bias signal to decrease the originally measured force fight.

DETAILED DESCRIPTION OF THE INVENTION

Figure 1:
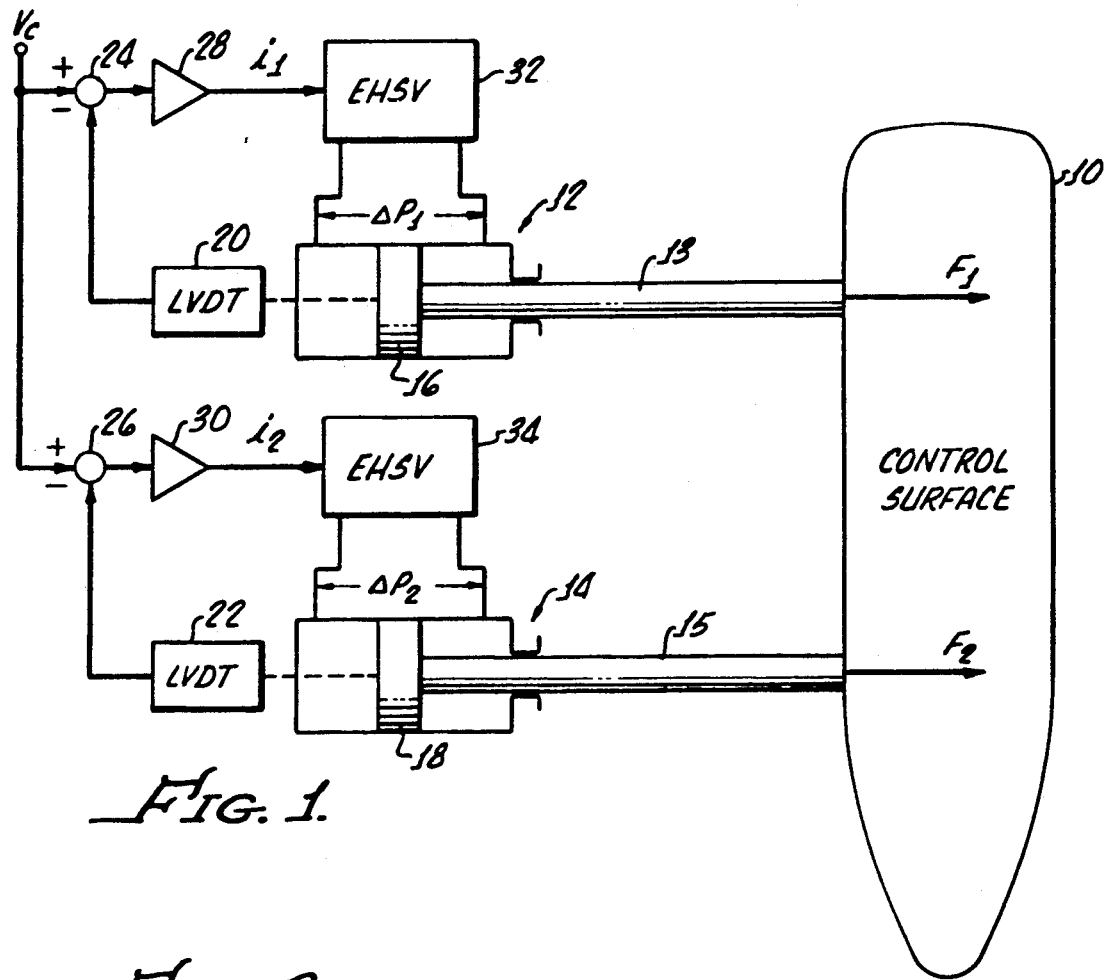
FIG. 1 shows a dual servo actuation system operating a single control surface.

A typical and exemplary dual servo actuation system to which principles of the present invention may be applied is illustrated in FIG. 1, wherein a single control surface 10, such as an aircraft aileron, elevator, wing flap, or the like is operated by first and second hydraulic actuators 12 and 14, including piston shafts 13 and 15 connected at one end to actuator pistons 16 and 18 and at the other end to mutually spaced areas of common control surface 10. The piston shafts 13,15 tend to exert forces indicated as F1 and F2 on the control surface. Positions of the actuator pistons 16,18 are sensed by pickoffs 20 and 22, shown as known linear variable differential transducers (LVDT) which feed electrical signals back to servo valve summing points or error circuits 24,26, both of which also receive an actuator valve stroke command in the form of a common electrical signal $V_c$. The command signal $V_c$ is differentially combined with the position feedback signals in the error circuits 24,26 to provide error or difference signals that are fed to servo amplifiers 28,30, which control electro hydraulic servo valves 32,34. The valves in turn control pressure from a pressure supply (not shown) to respective sides of the actuator pistons 16,18.

Figure 2:
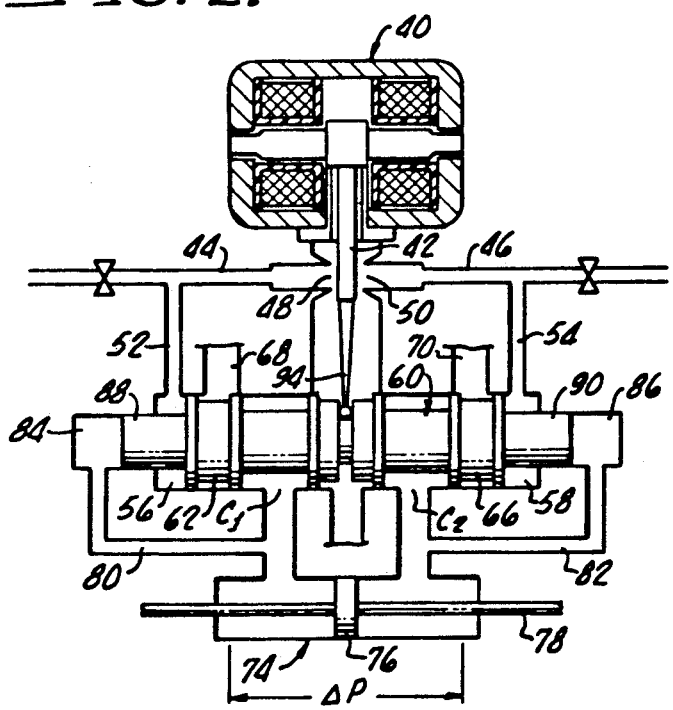
FIG. 2 is a simplified illustration of an exemplary low gain pressure flow control (PQ) servo actuator that may be employed in a multiple actuator system.

The present invention is applicable to many different types of servo valves, but may be most commonly employed with a relatively low pressure gain pressure and flow control (PQ) servo valve. An example of a PQ valve that is structurally similar to a valve that may be employed in the practice of the present invention is illustrated in U.S. Pat. No. 3,464,318, to W. J. Thayer et al, for Servomechanism Providing Static Load Error Washout. This patent describes a synthesized flow control servo valve which is similar to the exemplary servo valve schematically illustrated in FIG. 2 hereof. It will be readily appreciated that many other different types of valves, whether high gain or low gain, flow control, pressure control or pressure and flow control, may usefully employ principles of the present invention. Nevertheless, for purposes of illustration, an exemplary PQ valve as illustrated in FIG. 2 includes a torque motor 40, energized by an electrical current, having a pivoted flapper 42 that controls pressure from a supply (not shown) via conduits 44,46 to nozzles 48,50, which feed pressure via conduits 52,54 to end chambers 56,58 of a valve spool 60. Spool 60 has valve lobes 62,66 controlling flow from supply pressure ports 68,70 to the valve chamber and thence under control of the valve lobes, depending upon valve spool position, via conduits C1 and C2 to opposite sides of an actuator 74, having a piston 76 therein. The piston includes a shaft 78 adapted to be connected to the load. Load pressures appearing in the actuator on opposite sides of the piston are fed back via conduits 80,82 to pressure chambers 84,86 at opposite ends of the valve spool where the pressures are applied to stub shafts 88,90 on the ends of the spool, and thus effectively are summed with the pressures on the valve spool caused by the torqued position of flapper 42. A valve spool position pickoff in the form of a slender resilient member or wire 94 provides a spool position feedback that is mechanically summed with the command signal as indicated in connection with the description of FIG. 1, where this position feedback is shown to be electrically summed.

In the valve of FIG. 2 pressures on opposite sides of piston 76 may be measured as an actuator differential pressures $\Delta P$ to detect force applied by the individual actuator.

Figures 3, 4:
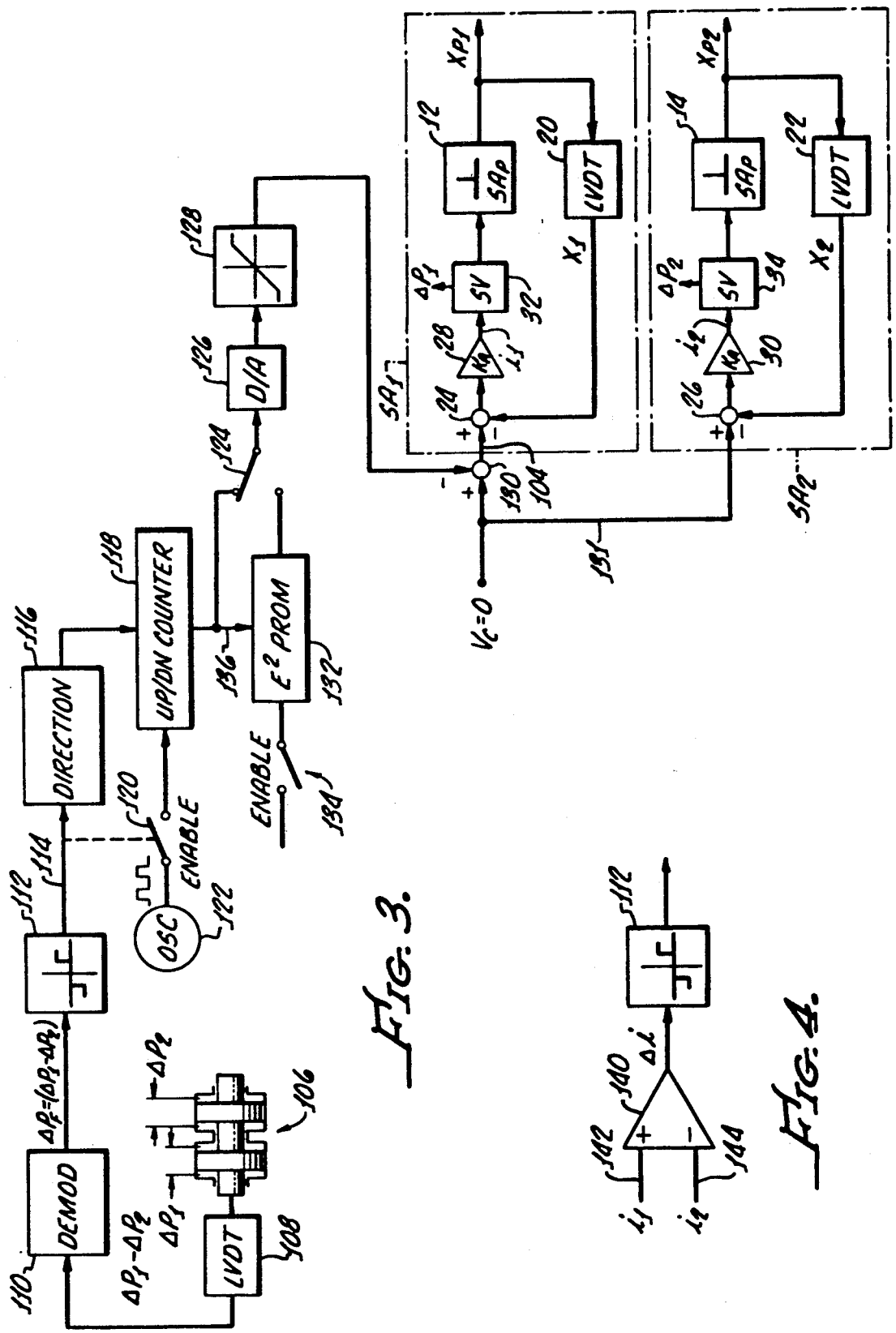
FIG. 3 is a block diagram of an auto rigging or force fight bias system employing principles of the present invention.
FIG. 4 shows a modification of the system of FIG. 3.

A simplified schematic illustration of a servo actuator that may be employed in the present invention is depicted in FIG. 3 in the dotted box SA1. An identical servo actuator, indicated in the dotted box SA2 in FIG. 3, is also shown. These actuators are the same as the actuators shown in FIG. 1. SA1 includes a valve amplifier 28, having an input from an error circuit 84, with the output of the amplifier feeding the servo valve 32, which in turn controls flow of hydraulic fluid under pressure to the actuator 12. Where a valve such as shown in FIG. 2 is used, the output of amplifier 28 is applied to the torque motor 40. The output of actuator 12 is a piston shaft displacement (stroke) indicated as $X_{p1}$, which is fed to the control surface 10 (FIG. 1) to exert a force F1 thereon. Position of valve 12 is fed back through the position pickoff 20, which feeds back an electrical signal $X_1$, representing the actuator piston displacement, for differential combination with an input command signal on a line 104 forming the second input to error circuit 24.

Servo actuator SA2 is identical to servo actuator SA1, and the two develop pressure differentials, that is, pressure differences across the pistons thereof, indicated as $\Delta P_1$ and $\Delta P_2$ in the drawings. As shown in FIG. 2, the differential pressure across the actuator piston is the same as the differential pressure in conduits C1 and C2 of the valve of FIG. 2. Servo actuator SA2 provides an actuator shaft output stroke indicated as $X_{p2}$ to feed back an electrical position signal $X_2$ to its error network, which also receives the common command signal $V_c$, as previously mentioned.

In accordance with one feature of the invention, differential pressures $\Delta P_1$ and $\Delta P_2$ which are derived from the two actuators (or from the valves) are coupled by hydraulic conduits (not shown) to opposite sides of a summing piston 106 so that the single summing piston is displaced with a magnitude proportional to the magnitude of the difference between $\Delta P_1$ and $\Delta P_2$ and in a direction determined by the sense of such difference. A position pickoff 108 on the summing piston 106 provides an electrical difference signal $\Delta P_1 - \Delta P_2$ that represents the force fight. The difference signal is fed through a demodulator 110 to provide the force fight difference signal $\Delta P_F$ that is fed to a threshold detector 112. If the difference signal $\Delta P_F$ has a magnitude above the threshold established in the detector 112, an output signal (of one sense or the other) appears on an output line 114 of the detector, and is fed through a direction control circuit 116 that is provided to control the direction of an up/down counter 118. An output of either sense from the threshold detector also operates a counter enable switch 120 which, when the threshold circuit provides an output, feeds counting pulses at a fixed frequency from an oscillator 122 to be counted by the up/down counter 118. The number in the counter, even while such number changes, is fed via a switch 124 to a digital to analog converter 126 and thence through a current limiting circuit 128 as a varying bias signal to a difference circuit 130 that receives as its second input the commanded input signal $V_c$ on a line 131. As will be described below, this bias signal varies only until $\Delta P_F$ falls below the threshold, at which time a force fight bias signal has been generated.

The auto rigging or force fight bias signal generation is performed under static conditions of the driven member. The operation described to this point is not carried out while the servo system is commanded to control different selected positions of the driven member. The described auto rigging is, effectively, a preliminary calibration or, more accurately, a preliminary determination of a fixed bias to be used during subsequent operation. Thus, at this fixed bias determination, the commanded input signal $V_c$ has a fixed, predetermined value, such as zero, but the servo actuators, of course, are energized. However, even with a zero commanded input, for reasons previously described, including valve misalignment, electronic offset, physical mounting discrepancies of the actuators, loose bolts, normal changes, drift and aging of electrical components, there is a force fight. Because of such discrepancies, the two servo loops attempt to displace the piston of at least one of the actuators. Such displacement exerts a force on the driven member. This force in turn is transmitted by the driven member to affect the static or steady state operation of the second of the servo actuation loops. Accordingly, in this commanded static condition, the force fight is effectively measured as $\Delta P_1 - \Delta P_2$, and, for as long as this difference remains above the threshold, a varying bias count is generated in the up/down counter.

Direction circuit 116 causes the counter to count in one direction or the other, depending upon the sense of the difference signal $\Delta P_F$. As the number in the up/down counter increases, the bias signal fed back from the digital to analog converter 126 to the difference circuit 130 increases in a sense that tends to decrease the magnitude of the measured force fight. As the force fight decreases, it approaches the threshold level, and when the decreasing $\Delta P_F$ falls below the threshold level, there is no longer an output from the threshold circuit on line 114. Absence of an output on line 114 causes switch 120 to disable the counting by the counter, which then contains and stores the number that exists at the time of operation of switch 120. The number stored at this time is the fixed bias magnitude.

Simultaneously with operation of switch 120, which occurs when the measured difference of differential pressures $\Delta P_F$ drops below the threshold, a non-volatile memory 132, such as an $E^2PROM$ is enabled, via a switch 134 connected (by means not shown) to be operated by the absence of an output from threshold detector 112. Thus, the number in the counter at that time is dumped into the memory 132 via a plurality of lines 136. In addition, at this same time, switch 124 is operated to disconnect the counter from the digital to analog converter 126 and, instead, to connect the input of the digital to analog converter 126 to the output of the non-volatile memory 132. Now the auto rigging or generation of the fixed bias signal is completed, a fixed bias signal is stored in the non-volatile memory, and the system is ready for operation. During subsequent system operation the fixed bias signal from memory 132 is continuously applied to difference circuit 130 where it is combined with the commanded input signal that is fed in common to operate both servos.

The bias signal permanently stored in memory 132 is sufficient, when applied to the input of amplifier 28 of servo actuator SA1, to substantially hold the force fight to a value below that selected by the threshold 112. Although the drawings illustrate the bias signal as being applied to servo actuator SA1, it will be readily appreciated that the bias signal could just as readily be applied in a like manner to the other of the servo actuators SA2, instead of being applied to SA1, or the bias signal may be differentially applied to both SA1 and SA2 with opposite sense.

It is presently preferred to carry out the auto rigging operation prior to each operation of the overall system in which the driven member is employed. Thus, for example, if the driven member is an aircraft control surface, the aircraft standard pre-flight ground check is completed, before each flight, with the aircraft on the ground. After completing all of the electrical checks, with all control surfaces remaining in a null or fixed position, the described auto rigging operation will be carried out. In other words just prior to each flight of the aircraft, the force fight that is due to the collective errors inherent in the several servo actuation loops is measured under static conditions, with a predetermined fixed (preferably zero) commanded input $V_c$. A fixed bias signal representing the measured force fight is stored. With the fixed bias signal stored, the aircraft is ready for use, and this fixed bias will continue to be applied during the flight of the aircraft and subsequent operation of the controlled surface.

Particularly under static conditions, the PQ valve has the characteristic that the current at the output of amplifier 28 and the corresponding amplifier of the other servo actuator is directly proportional to the differential pressure across the piston of the actuator. Accordingly, it is possible, when such valves are employed, to substitute for the summing piston 106 a differential amplifier, such as amplifier 140 of FIG. 4, which receives as inputs a first current $i_1$ on a line 142 from the output of amplifier 28 and a second current $i_2$ on a line 144 from the output of the corresponding servo amplifier 30 of the other servo actuator of FIG. 3. The two currents are applied to the inverting and non-inverting inputs respectively of amplifier 140, which provides at its output the current difference $\Delta i$, which is fed, just as is the difference signal $\Delta P_F$, to a threshold circuit 112 connected to the remainder of the auto rigging system, just as described in connection with FIG. 3. This arrangement has the advantage of decreased cost because the more expensive summing piston 106 of FIG. 3 is effectively replaced by the less expensive differential amplifier 140. Because the amplifier output current of the PQ valve is proportional to load pressure (e.g. differential pressure across the actuator piston) under static conditions, differentially combining pressure differentials across the two pistons of such valve is equivalent to differentially combining amplifier output currents.

Because the described system employs an effectively statically generated bias signal, it is not necessary to provide any additional feedback loops in the relatively complex circuits of these servo actuator valves (which may already include pressure and position feedbacks). Thus, potential lack of stability that could be caused by such additional circuits is avoided. The described auto rigging is effectively a calibration or balancing of the two servo actuators, which could be carried out one time at the aircraft assembly plant when the system is first manufactured. However, the bias can change over time with aging of parts and other environmental effects, so that it should be carried out at least periodically. As previously mentioned, it is preferred to perform this auto rigging function prior to each flight of an aircraft, immediately after all ground checks have been completed.

The use of a non-volatile memory is preferred because a temporary loss of power could cause loss of a number in the counter, and thus the bias signal could be lost.

Although the auto rigging system has been described in connection with its application to PQ valves in a system with two actuators, it will be readily appreciated that principles of the invention may be applied to correct imbalance in multiple actuator systems that use servo actuators of other types and employing other types of servo mechanisms. Moreover, principles of the invention may be employed with systems having three or more of such servo actuators.

The foregoing detailed description is to be clearly understood as given by way of illustration and example only, the spirit and scope of this invention being limited solely by the appended claims.

What is claimed is:

1. A method for adjustment of a servo system in which at least first and second electrically controlled servo valves control respective ones of first and second actuators that are connected to drive a common driven member, and in which a force fight may result from multiple driving of the driven member, said method comprising:
   applying a fixed electrical command input to said servo valves to command a nominally equal stroke of said first and second actuators,
   generating a bias signal indicative of the magnitude of an indicated force fight resulting from application of said fixed electrical command,
   storing said bias signal, operating the servo valves of said servo system to drive said driven member after said bias signal is stored, and applying said stored bias signal to at least one of said servo valves in a sense to decrease said indicated force fight.

2. The method of claim 1 wherein said step of applying a fixed command input comprises the step of applying an input that has a value that nominally commands zero driving of said driven member.

3. The method of claim 1 wherein said driven member is a control member of an aircraft, and including the step of performing said method before a flight of said aircraft and performing said step of applying said stored bias signal during flight of said aircraft.

4. The method of claim 1 wherein said driven member is a control member of an aircraft, wherein said method is carried out before each flight of said aircraft, and wherein said step of applying said bias signal comprises a step of applying a fixed bias signal during flight of said aircraft.

5. The method of claim 1 wherein said step of generating the bias signal comprises sensing first and second pressure differentials across said first and second actuators, respectively, and generating said bias signal in accordance with the difference between said pressure differentials.

6. The method of claim 1 wherein said servo valves have electrical control currents that are respectively proportional to pressure differentials across respective actuators, and wherein said step of generating the bias signal comprises sensing first and second electrical control currents in said first and second servo valves, respectively, and generating said bias signal in accordance with the difference between said first and second control currents.

7. The method of claim 1 wherein said step of generating a bias signal is carried out before said servo system is commanded to operate said driven member, and wherein said step of applying said bias signal comprises a step of applying a fixed bias signal while said servo system is commanded to operate said driven member.

8. In a servo actuator system wherein first and second actuators are connected to drive a common member, and wherein each actuator is controlled by a different one of first and second electrically controlled servo mechanisms arranged to receive a common command input and to cause the actuators to have nominally equal strokes, an automatic rigging system comprising:

means for generating a fixed bias signal representing a difference in strokes of said first and second actuators when said servo mechanisms have a common fixed command input, means for storing said fixed bias signal, and means operable after said fixed bias signal has been stored and responsive to said storage means for biasing at least one of said electrically controlled servo mechanisms in accordance with said fixed bias signal in a sense to decrease force fight resulting from different strokes that occur with the common, fixed command input.

9. The system of claim 8 wherein said bias signal is generated when said common fixed command input is zero.

10. In a servo actuator system wherein first and second actuators are connected to drive a common member, and wherein each actuator is controlled by a different one of first and second electrically controlled servo mechanisms arranged to receive a common command input and to cause the actuators to have nominally equal strokes, an automatic rigging system comprising:

means for generating a bias signal representing a difference in strokes of said first and second actuators when said servo mechanisms have a common fixed command input, means for storing said bias signal, and means responsive to said storage means for biasing at least one of said electrically controlled servo mechanisms in a sense to decrease force fight resulting from different strokes that occur with the common, fixed command input, said step of generating a bias signal comprising the steps of generating a difference signal representing the difference in strokes of said first and second actuators, means for generating a bias count signal that varies while said difference signal has a magnitude greater than a predetermined threshold, means for applying said bias count signal to at least one of said electrically controlled servo mechanisms while said difference signal is greater than said threshold, so as to decrease said difference in strokes, means for storing the magnitude of said bias count signal when the difference of strokes of said actuator and when said difference signal becomes less than said predetermined threshold, and means for applying said stored bias count signal to at least one of said electrically controlled servo mechanism inputs as said auto rigging bias signal.

11. The apparatus of claim 10 wherein each of said servo mechanisms includes a servo control valve, and wherein said difference signal comprises the difference of first and second pressure differentials across respective ones of said servo control valves.

12. The apparatus of claim 8 wherein each of said servo mechanisms includes a servo amplifier having a control signal output substantially proportional to the output force of the actuator controlled by said servo mechanism, and including means for differentially combining the control signal outputs of said servo amplifier to generate said bias signal.

13. An auto rigging system for a servo system having first and second hydraulic actuators connected to drive a common member, with each actuator being controlled by an individual electrically controlled servo valve, and both said servo valves having a common command input, said auto rigging system comprising:

means for detecting differential pressures across said first and second actuators respectively and for generating a difference signal representative of the difference between aid differential pressures, a threshold circuit having said difference signal as an input, and having an output indicative of the relation of the input thereto to a reference level, a counter having an output, means for enabling said counter in accordance with the output of said threshold circuit, bias control circuit means for applying the output of said counter to the command input of at least one of said electrically controlled servo valves, means responsive to an output of said threshold circuit indicative of a decrease in the value of its input below said reference level for disabling said counter, storage means for storing the contents of said counter as a fixed bias signal when the counter is disabled, and means responsive to said storage means for applying said fixed bias signal to said bias control circuit means.

14. In a multiple actuator servo system wherein first and second hydraulic actuators are connected to drive a common member under respective control of first and second electro hydraulic servo valves, both said servo valves having a common electrical command input for nominally commanding a predetermined stroke of said actuators in unison, a method for automatically equalizing actuator strokes comprising the steps of:

detecting first and second pressure differentials across said first and second actuators respectively, differentially combining said pressure differentials to provide a difference signal, comparing said difference signal with a threshold to provide a bias count enable signal when the difference signal exceeds said threshold, generating a varying bias count signal while said bias count enable signal exceeds said threshold, applying said varying bias count signal to at least one of said electrical command inputs of said electro servo valve in a sense to decrease said difference signal, terminating variation of said varying count signal at a time when said difference signal drops below said threshold value and at such time storing the magnitude of said varying bias count signal as an operating bias signal, applying the operating bias signal to said at least one servo valve command input as a fixed bias therefor, and terminating application of said varying bias count signal.

15. In a multiple actuator servo system wherein first and second hydraulic actuators are connected to drive a common member under joint control of first and second electro hydraulic servo valves that receive first and second amplifier output signals of respective first and second servo amplifiers, said servo amplifiers having an electrical command input for nominally commanding a stroke of said actuators in unison, a method for establishing fixed equalization of strokes of said actuators comprising the steps of:

applying a fixed electrical command input to said servo amplifiers, comparing said amplifier output signals to provide a difference signal, employing said difference signal to generate a fixed bias signal, applying said bias signal and said fixed command input to at least one of said amplifiers, said step of employing said difference signal comprising the step of generating said bias signal with a selected magnitude that equalizes said actuator strokes when said bias signal and said fixed command input are applied to said at least one amplifier, storing said bias signal as a fixed signal of said selected magnitude, commanding subsequent operation of said actuator after said step of storing, and applying said fixed signal of selected magnitude to said at least one amplifier during said subsequent operation.

16. The method of claim 15 wherein said step of employing said difference signal comprises the steps of comparing said difference signal with a threshold to provide a bias variation enable signal when the difference signal exceeds said threshold, generating a varying bias count signal while said difference signal exceeds said threshold, said step of applying said bias signal comprising the steps of applying said varying bias count signal to at least one of said amplifiers in a sense to decrease said difference signal, terminating variation of said varying bias count signal at a time when said difference signal drops below said threshold value and at such time storing the magnitude of said varying bias count signal as an operating bias signal of said selected magnitude, and applying the operating bias signal to said at least one of said amplifiers as a fixed bias therefor.

* * * * *

UNITED STATES PATENT AND TRADEMARK OFFICE
CERTIFICATE OF CORRECTION

PATENT NO. : 5,129,310
DATED : July 14, 1992
INVENTOR(S) : Carlton Y. Ma

It is certified that error appears in the above-identified patent and that said Letters Patent is hereby corrected as shown below:

Claim 12 (Column 8, line 41), delete "amplifier" and substitute therefor ---amplifiers---.

Claim 13 (Column 8, line 53) delete "aid" and substitute therefor ---said---.

Signed and Sealed this

Fourteenth Day of September, 1993

Attest:

BRUCE LEHMAN

Attesting Officer     Commissioner of Patents and Trademarks